United States Patent [19]

Lings

[11] Patent Number: 4,821,826

[45] Date of Patent: Apr. 18, 1989

[54] COMPONENTS IN OR FOR SELF-POWERED VEHICLES

[75] Inventor: Geoffrey P. Lings, Bourne, England

[73] Assignee: National Research Development Corporation, London, England

[21] Appl. No.: 172,330

[22] Filed: Mar. 23, 1988

Related U.S. Application Data

[63] Continuation of Ser. No. 24,080, Mar. 10, 1987.

[51] Int. Cl.$^4$ ................................................ B60K 5/04
[52] U.S. Cl. ..................................... 180/58; 180/292; 180/297; 180/73.4; 280/696; 280/697; 280/701; 123/195 R; 123/195 AC; 123/196 R; 123/472; 123/52 M
[58] Field of Search ................... 180/297, 292, 73.4, 180/58; 123/195 AC, 198 E, 195 C, 195 S, 195 R, 470, 472, 52 M, 196 R; 280/696, 697, 698, 701

[56] References Cited

U.S. PATENT DOCUMENTS

| 1,415,374 | 5/1922 | Lovejoy | 123/198 E |
|---|---|---|---|
| 2,471,135 | 5/1949 | Wyeth | 280/689 X |
| 3,209,851 | 10/1965 | Collins | 180/292 |
| 3,399,743 | 9/1968 | Hetmann | 180/292 X |
| 4,271,920 | 6/1981 | Barthelemy | 180/55 |
| 4,519,348 | 5/1985 | Hamilton | 123/195 C |
| 4,637,354 | 1/1987 | Tominaga et al. | 180/219 X |

FOREIGN PATENT DOCUMENTS

| 0087270 | 8/1983 | European Pat. Off. |
| 654326 | 12/1937 | Fed. Rep. of Germany . |
| 1962539 | 6/1971 | Fed. Rep. of Germany . |
| 2913076 | 10/1979 | Fed. Rep. of Germany . |
| 1164903 | 10/1958 | France . |
| 2392842 | 12/1978 | France . |
| 698921 | 12/1965 | Italy . |
| 289694 | 8/1973 | U.S.S.R. . |
| 484443 | 5/1938 | United Kingdom . |
| 520639 | 4/1940 | United Kingdom . |
| 889123 | 2/1962 | United Kingdom . |
| 897646 | 5/1962 | United Kingdom . |
| 1162081 | 8/1969 | United Kingdom . |
| 1386951 | 3/1975 | United Kingdom . |

Primary Examiner—David M. Mitchell
Assistant Examiner—Tamara L. Finlay
Attorney, Agent, or Firm—Cushman, Darby & Cushman

[57] ABSTRACT

Components in or for self-powered vehicles, including in particular an integrated power unit in which a reciprocating-piston internal combustion engine and a transmission system are formed as a compact, single structural item in which the engine cylinders and the principal rotary members of the transmission are all located to one side of a plane which lies normal to the cylinder axes and includes the engine crankshaft axis. Compactness and simplicity are further promoted by designing the casing structure of the power unit to include an indivisible main component which encases parts of both the engine and the transmission system. The invention also includes features combined with and/or related to such a power unit, including a specific design for the transmission system, an arrangement of the induction system for the engine, installation arrangements for the power unit within vehicles, and related vehicle suspension systems.

15 Claims, 10 Drawing Sheets

COMPONENTS IN OR FOR SELF-POWERED VEHICLES

This is a continuation of application Ser. No. 024,080, filed Mar. 10, 1987.

This invention relates to self-powered vehicles, and to novel arrangements in or for them of integrated power units, internal combustion engines, rotary transmission systems, suspension systems and mounting systems, such arrangements individually or in combination promoting compactness and simplicity and improved efficiency generally.

The integration of engine, gearbox and final drive into a single unit located adjacent to the driven wheels is an established automotive design technique which tends to result in reduced weight and cost, and improved transmission efficiency. The placement of the unit in a transverse position (i.e with the crankshaft parallel with the virtual axles of the car) is also well established and tends to result in more efficient space utilisation within the vehicle envelope with further improvement in transmission efficiency due to the elimination of a right-angle drive.

Most existing arrangements of transverse power units fall into two basic categories. Firstly, those with the engine placed mainly above the transmission components, but substantially central within the width of the vehicle, and secondly, those where the transmission is to one end of the engine crankshaft, such that the whole forms an assembly which is asymmetric relative to the vehicle longitudinal centre line, with the result that, unless special measures are taken, the drive shafts to the two wheels will be of unequal length.

Such power units are more commonly intended for applications in vehicles driven through their front wheels, such as passenger saloon cars of small to medium size. However, with rising power to weight ratios, front wheel drive becomes increasingly undesirable due to considerations of traction, and therefore, particularly in cars of higher performance an integrated power unit located adjacent to the rear wheels may be more advantageous.

Various drawbacks and limitations are apparent in existing transverse power unit designs, particularly with regard to rear drive applications.

In passenger saloon cars, and more particularly those of the so called 'hatchback' variety, and in estate car derivatives, where it is desirable that the passenger compartment should be freely interconnectable with the rear luggage compartment, such that, by suitable means, the entire rear portion of the body may be converted to an unobstructed load-carrying space having a substantially flat platform the existence adjacent to the rear wheels of a power unit of the profile typical of existing designs may render such provision ineffectual, especially where the engine is above the transmission. A similar drawback applies in the case of commercial vehicles. Also, in sports cars, wherein the location of an integrated power unit immediately behind the occupants is particularly advantageous, both with regard to traction in a high performance application and also to the marketing appeal of a configuration akin to that of current racing cars, existing examples serve to illustrate the difficulty of providing adequate luggage capacity anywhere within the vehicle, and also of providing stowage for small items within the passenger compartment, as is desirable in the interests of convenient usage.

The space required to accommodate an efficient induction system to the engine may particularly exacerbate these difficulties. Meanwhile, unless measures are taken to minimise the mass of a rear-mounted power unit, vehicle stability and handling problems may arise due to an excessive rearward weight bias.

Even in front engine applications existing transverse power units, especially those having the engine above the transmission, may suffer a drawback in that the height, occurring at a point far forward in the vehicle, may impose restrictions on the provision of bodywork having favourable aerodynamic properties.

A further consideration in any design incorporating an integrated power unit is that additional benefit may derive from mounting the suspension system of the adjacent wheels direct to the power unit, the whole resultant assembly then being flexibly mounted to the vehicle structure. By a suitable selection of mounting flexibilities, the power unit mass may thus be made to act as an effective dynamic absorber of road-induced vibrations. Such an arrangement may also permit substantial reductions in weight and cost, providing that it can be achieved with a minimum adjunction of material to the power unit structure, such as brackets and subframes. Also, in rear drive applications, further advantage, particularly to weight and cost, may accrue by utilising the final drive shafts as part of the suspension linkage, but this is feasible only where the two shafts are of equal and suitable lengths. Existing power units are not known to have been designed with the above provisions specifically in mind, the requirements of which may be more easily met in arrangements where the main engine structure and the final drive gears are both located substantially central within the width of the vehicle.

In certain applications, such, symmetry may also be desirable for aesthetic or other reasons, such as to permit the use of an engine having more cylinders in line across a vehicle of given width. Also, in front drive applications, the use of an asymmetric arrangement wherein the drive shafts to the two wheels are of unequal lengths may result in undesirable disturbances being felt through the steering wheel, particularly in more highly powered vehicles.

A further drawback of known existing power unit designs, and more particularly of those which do offer the advantage of substantial symmetry, concerns the efficiency of the gear transmission system. An important consideration in the design of any vehicle transmission gearing is to minimise the total number of gear meshing points between the engine crankshaft and the driven road wheels, since at each meshing point useful power will be lost while unwelcome noise may be generated. This consideration may be regarded as especially cogent in the case of an integrated transverse power unit if full advantage is to be taken of the inherent efficiency benefits mentioned in the opening paragraphs.

It may be shown of typical existing designs having manually operated gearboxes, that the practical minimum total number of such meshing points is two, as is achieved by means of a widely favoured arrangement of the asymmetric variety, wherein a gearbox of the 'two shaft' or 'all indirect') type is located to the end of the engine, with its input shaft coaxial with the engine crankshaft, drive in each of the forward ratios provided then being simply through one of a number of alternatively selectable gear pairs, the only other gear meshing point occurring at the final drive gears which normally are additionally provided, both to bring the output to a convenient point and also since the required low ratios cannot usually be provided in a single step.

In power units of the more symmetrical variety, where the gearbox input shaft is not coaxial with the engine crankshaft a primary drive means must be provided, which may take the form of two or more gears or a chain drive, and which therefore adds a further source of inefficiency In an existing design of this type, a total of two meshing points is again achieved, but only in one of the forward ratios provided, by means of a design where the primary drive consists of a single pair of gears, while the gearbox is of the 'three shaft' (or 'direct top' or 'layshaft') type, such that the input and output shafts are coaxial and may be joined together to provide a direct straight-through drive as one of the selectable ratios, the second meshing point then again occurring at the final drive gears which are also provided. However, a drawback of this arrangement is that, when any of the other forward ratios are selected, two additional meshing points occur within the gearbox as drive is transferred to and then back from the layshaft.

This disadvantage is more manifest where, in an arrangement of this type, it is required to incorporate a gearbox having, for example, five forward speeds, and of the type being increasingly favoured in the interests of fuel efficiency where the two highest forward ratios are both intended to be used extensively, since if fourth gear is made 'direct', fifth would involve at least four total meshing points, and vice versa.

If, in a power unit having a primary drive means, a gearbox of the alternative 'two shaft' variety is used, the practical minimum total number of meshing points achievable is three in all gears, one more than the optimum. A further disadvantage of any power unit arrangement utilising a manual gearbox of the 'two shaft' variety is that this makes it more difficult to provide for the optional employment of an automatic gearbox of conventional form.

Further concerning existing transmission systems, the number of components, particularly gears, each different from any other, is usually considerable, and the cost of manufacture is therefore high.

An aim of the present invention is to provide an improved arrangement for an integrated automotive power unit which includes a reciprocating piston internal combustion engine, a transmission system and all necessary auxiliary equipment such that the overall profile, particularly as viewed in a direction along the crankshaft axis, is minimised and of a shape suitable, for example, for incorporation into a compact sports car or high performance saloon car wherein drive is to be provided through the rear wheels and wherein a favourable arrangement of passenger and luggage accommodation is to be provided, it being intended that the power unit should be disposed in such application with its crankshaft transverse and its main structure arranged approximately symmetrical with respect to the longitudinal centre line of the vehicle. A further aim of the invention is to provide a manually operated geared transmission system arranged so that the connections to the final drive output shafts to the wheels may also be symmetrically disposed with respect to the aforementioned centre line, and also arranged, in the interests of efficiency, such that all shafting is parallel with the crankshaft axis, and such that in more than one of the forward ratios provided the total number of loaded gear meshing points between the crankshaft and the driven road wheels is only two, and further arranged such that the cost, particularly of the gear elements, may be minimised. It is also an aim of the invention to provide an associated suspension system of simple design which may incorporate the final drive output shafts as part of its linkage and which is mounted directly to the power unit so as to form a sub-assembly which may be flexibly mounted to the vehicle structure in a favourable manner. The invention further aims to satisfy the requirements of lightness, low cost of manufacture, ease of servicing structural stiffness, a low centre of gravity, a simple gearchange arrangement and an induction system of favourable form. It is intended that an embodiment of parts of the invention should be equally suitable for vehicles driven through the front wheels or through four or more wheels.

With the above aims in view, then, according to the present invention, there is provided an integrated power unit incorporating a reciprocating piston internal combustion engine and a transmission system, in an arrangement where the engine, having a number of cylinders disposed in line, is designed to operate in a position with its crankshaft axis approximately parallel to an adjacent virtual axle of a motor vehicle, and with its cylinder axes contained in a plane describing an acute angle above the horizontal, such that the crankshaft axis is at a level substantially similar to that of the virtual axle while the cylinder head is located approximately directly over the virtual axle, and with its cylinders disposed either side of the vehicle longitudinal centre line in a substantially symmetrical manner, and with the transmission being accommodated in the main within casings formed beneath the cylinders such that a section which may lie beneath the central cylinders is extended furthest from the crankshaft and encompasses an axis substantially coincident with the virtual axle at the normal ride height and known as the final drive axis, the power unit being designed to be in direct driving communication with the adjacent road wheels through universally jointed drive shafts whose inner ends are connected with output driving members of the power unit at points which may be symmetrically disposed either side of the vehicle longitudinal centre line and which lie on the final drive axis, which axis may, by virtue of the general arrangement of the power unit, lie in a plane which also includes a joint face between the cylinder block and cylinder head.

These features of the invention afford a particularly compact, favourably shaped assemblage, advantageous not only spatially, but also to the provision of a power unit casing structure which is light and stiff and suitable for example to act as a stressed member supporting vehicle suspension loadings.

In an embodiment in which the said casing structure is of a preferable design, there is provided a main casing part, formed so as to include cylinder crankcase and main transmission housings in an integral unit, while there may additionally be provided a combined crankcase and transmission closing part, a final drive covering part, a cylinder head and end covering parts, such provisions affording a structure of particularly high efficiency and low cost, by virtue of the small number of jointings involved while at the same time facilitating manufacturing and assembly processes.

The crankcase and transmission closing part may adjoin the main casing part in a plane including the crankshaft axis, thereby permitting a favourable design wherein the engine main bearings are provided in housings diametrally split by the joint face such that semi circular portions thereof reside in each of the two adjoining casing parts, this feature rendering unnecessary the use of separate bearing caps and at the same time providing a particularly rigid means of support for the crankshaft.

Similarly, the final drive covering part may adjoin the main casing part in a plane including the final drive axis, in a design whereby the resultant enclosure constitutes the aforementioned furthest extended section of the transmission housing, and such that the aforementioned power unit output drive members may emerge from the sidewalls of the resultant enclosure, and wherein there may be provided within the resultant enclosure, parts centred on the final drive axis and connected with the power unit output drive members, such as a differential and gearing attached thereto, which parts may be supported by bearings provided in housings diametrally split by the joint face such that semi circular portions thereof reside in each of the two adjoining casing parts, such a design providing a simple construction of low cost and also a convenient means of assembly of the final drive parts.

In a particularly advantageous embodiment of the invention, the features of the last paragraph are incorporated, together with an aforementioned feature whereby the final drive axis lies in a plane which also includes a joint face between the cylinder block and cylinder head, and thus there may be provided on the main casing part a single extended flat surface designed to serve as an abutment face both for the cylinder head and for the final drive covering part, thereby enabling a further reduction in machining costs Preferably this face may be machined parallel with a further facing of the main casing part which may include the crankshaft axis, and to which abuts the combined crankcase and transmission closing part, and perpendicular to the cylinder axes.

The cylinder head design may include ports which emerge on the sideface which is adjacent to the transmission parts, and in order then to permit a compact juxtaposition of cylinder head and final drive components, particularly in an embodiment which may incorporate the features of the two preceding paragraphs, such ports may be provided having a steep downdraught angle relative to the cylinder axes, such that, where these are, for example, inlet ports, there may be provided extended induction tracts which run in a substantially straight line, passing immediately above the final drive parts, but which may yet, due to the general configuration of the power unit, be of an updraught nature, and such that their extremities may lie at a very low level outboard of the final drive parts, Such provisions are particularly advantageous in the case of an embodiment designed to be installed in the rear of a vehicle, and wherein the crankshaft is located in front of the final drive axis, and such that the extremities of the induction system, being low, may be accommodated beneath the boot floor of the vehicle, thus permitting the use of tracts which are long, and thereby favourable to the enhancement of engine output at a lower operating speeds, but which are free of sharp bends which might inhibit gas flow and hence power at higher speeds and which meanwhile cause a minimum of intrusion into areas of the vehicle which may be required to accommodate luggage or other components. Also, the inlet ports are thus provided at a favourable angle of approach to the cylinders.

In an embodiment wherein the engine incorporates a fuel injection system the injectors may be positioned on the upper side of the induction tracts at a point approximately directly above the final drive parts, and so as to be aimed in a favourable manner almost directly down the inlet ports onto the back of the inlet valves, but so as also to be located in a particularly accessible position. Fuel injection may be a particularly desirable feature of a power unit of the nature herein intended, both in order to further improve overall operating efficiency, and also to avoid problems such as fuel puddling which might otherwise be caused by the use of an updraught section in the induction tract, and the aforementioned features provide a particularly favourable installation.

Both the cylinder head and the crankcase closing part may be retained to the main casing part by fastening devices such as long bolts, and in an embodiment wherein the cylinder bore and the main bearing diameter are suitably related, the fasteners for the two components may share the same axes, and further, there may then be provided singular long fasteners passing right through the main casing part and serving to retain both the cylinder head and the crankcase closing part by linking those two parts together, and such fasteners may be provided such that they are threaded into the cylinder head from its underside, and such that they may be operated from outside the crankcase closing part. The power unit configuration proposed herein particularly facilitates such provision, which may be especially favourable in embodiments wherein considerations related to the design of the cylinder head dictate that a component such as a camshaft should be positioned such that it masks access to the cylinder head fasteners, as may occur particularly in cylinder heads of the four valve per cylinder variety with pent roof combustion chambers. Such a fastening arrangement may also be favourable to certain installations of the power unit in a vehicle.

The crankcase closing part may be designed such that the chamber in which the crankshaft operates is separated from a further lower chamber, in which may be contained lubricating oil, and the main crankchamber may thus be designed such that its internal surfaces are smooth and shaped so as to minimise crankcase windage losses. Furthermore, ports may be provided linking the two chambers, through which lubricant may return to the lower chamber, and these ports may be shaped so as to effect a natural continuation of the path of flow of lubricant within the main chamber, and hence so as to minimise restriction to the return flow, particularly in the case where the crankshaft rotates in a direction such that the crankpin moves downwards through the main proportion of the crankchamber in the crankcase closing part.

The transmission system may include, in addition to the aforementioned parts on the final drive axis, further parts such as might constitute a gearbox, and of which the principal functional elements are arranged along axes which may be mutually parallel and which may be called the gearbox axes, which parts may be accommodated within the power unit arrangement in a manner whereby particularly efficient use is made of an available space, and such that the parts are contained within a section of the aforementioned transmission housings which lies more adjacent to the crankcase and which may extend beneath the central and outer cylinders, and such that the gearbox axes are arranged substantially parallel to the final drive axis, and hence also to the crankshaft axis, and such that one gearbox axis, which may be called the gearbox mainshaft axis, may be located approximately midway between the final drive axis and the crankshaft axis, all three of which axes may lie on approximately the same level, while a second gearbox axis may be located substantially directly below the mainshaft axis. The further transmission parts may thus be accommodated entirely within the power unit profile which is determined by the arrangement of the engine and final drive parts, even though this profile is itself very compact. More specifically, all of these transmission axes, and also the cylinder axes, may thus be located on or to the same side of a plane which includes the crankshaft axis and which is normal to the common plane of the cylinder axes.

In order to effect driving communication between the crankshaft and gearbox mainshaft axes, which latter may also be called the gearbox input axis, there is provided a primary drive medium, which may be located to one end of the power unit, and which may take the form of the pair of gears, while there may also be provided adjacent thereto a clutch, preferably centred on the gearbox mainshaft axis, and thus arranged so as to be able to effect driving connection between the primary drive medium and the gearbox. Arranged thus, the periphery of the clutch parts need not, as it might were the clutch centred on the crankshaft axis, extend outside the profile of the power unit as determined by aforementioned components and as viewed in a direction along the crankshaft axis, not even in the regions where the said profile is determined solely by the cross-section of the crankcase structure, and also, as a result of this arrangement, parts which may be provided within the transmission system and associated with gearchanging, such as, for example, synchronisers, are not subject to the inertia of the primary drive parts. The combination of a clutch positioned thus and a primary drive consisting of only two gears is particularly favourable, the drive being efficient since only a single gear meshing point is involved, and more so since the gears may necessarily be of a large diameter and the loads at the meshing point thus correspondingly low, and while the inertia value of such gears may be considerable, the preferred clutch position eliminates any detrimental effect thereof. Further, since the gears are in permanent driving communication with the crankshaft, they may contribute a proportion of the flywheel effect required by the engine, and thus allow the use of a main flywheel of reduced mass, and also, since the flywheel effect is thus accumulated from contra rotating elements, a smoother idling performance may be expected of the engine. While the dynamic advantages associated with the combination of a two gear primary drive and a clutch located on the gearbox input axis are applicable to any power unit requiring a primary drive medium, such features are only feasible in a power unit arrangement such as that provided by the present invention, and where the gearbox input axis is at a sufficiently high level to enable the clutch to be provided with adequate clearance above the road surface. The preferred positioning of the clutch outboard of the primary drive components is also advantageous with regard to access and servicing.

In order that the profile of the power unit, as viewed in a direction along the crankshaft axis, should not be enlarged by requisite auxiliary components such as an alternator, a starter motor and a distributor, such components may be provided located to the ends of the power unit and extending outwards. In an embodiment wherein the clutch is positioned on the gearbox input axis, and physically outboard of the primary drive parts, and is of the dry plate variety, the alternator may be driven by means of a friction wheel engaging with the outer periphery of a drum containing the clutch parts, while the starter motor may be provided able to mesh with a gear affixed to the said drum, and these auxiliary components may then be arranged so as to lie one above the other, and extending outwards from an area approximately in line with the end of the crankcase, while the distributor may be driven from one end of the engine camshaft. In an embodiment wherein the engine is liquid cooled, a coolant pump may be provided driven from a point within the camshaft driving mechanism, and the pump may be located at a low level relative to the cylinders and cylinder head, such that coolant may flow advantageously in a basically upward direction, through the engine. An additional advantage of the foregoing features is that there is thus no need for any external belt drive, and further, no need for the crankshaft to emerge from the end covers of the power unit, and hence no need for oil sealing devices contacting the crankshaft.

Such sealing means may be provided on the gearbox input axis to protect the dry plate clutch, and provided the engine and transmission parts share a common lubricant the only other seals required are at the points where the final drive output members emerge from the transmission housings. The power loss associated with oil sealing may thus be minimised.

In view of further aims such as that concerning a small number of loaded gear meshing points, a preferable embodiment of the invention includes a transmission system such as that which is described in the text subsequent hereto. Whilst being based upon gearbox and final drive axes which may be arranged in the manner described in a preceding paragraph, the transmission system may also be used advantageously independently of the power unit described herein, for example in integrated power units of other configurations or in transaxle devices.

According to this aspect of the invention, there is provided a rotary transmission system, designed to operate in a motor vehicle as a combined gearbox and final drive mechanism affording a series of overall speed ratios, and incorporating an input shaft, a layshaft and a final drive output component, all rotatable about discrete axes which may all be arranged substantially parallel with the virtual axles of the vehicle, and incorporating also a set of gears arranged such that at least two gear pairs of differing ratio are alternatively engageable with each pair having a driving gear coaxial with the input shaft and a driven gear coaxial with the final drive output component, which gears may collectively be termed the final drive gears, while at least one further pair of gears is engageable to provide drive from the input shaft to the layshaft, and at least one pair of gears is engageable to provide drive back from the layshaft to a part coaxial with the input shaft.

A transmission system having these features can provide at least two speed ratios selectable such that in either of them, the drive path through the system is direct along the axis of the input shaft to a final drive driving gear, and thence via the corresponding driven gear to the final drive output component, such a drive thus including only a single gear meshing point between the input shaft and the final drive output component these speed ratios being termed the direct ratios and each being equivalent to a 'top' gear in the case of a conventional three shaft gearbox operating in conjunction with a final drive gear pair, while a number of further speed ratios, which may be termed the indirect ratios, may be provided by way of the layshaft, according to any known practice.

In an arrangement which represents a reversal of the practice which is more usual in layshaft gearboxes in motor cars, a number of indirect gear pairs are provided alternatively engageable between the input shaft and the layshaft, whilst there is also provided on the layshaft a constant mesh output pinion, engageable with an output gear.

In a particularly favourable embodiment the output gear referred to in the preceding paragraph is one of the final drive driving gears.

The features of this embodiment, which are especially suited to the power unit arrangement disclosed herein, or to other applications where the layshaft centre need not lie in a line between the centres of the input shaft and the final drive output component, can provide a number of indirect ratios equal to the number of indirect gear pairs, each such that when selected the drive path through the transmission system is from the input shaft, via the engaged indirect gear pair to the layshaft, and thence by way of a train of three gears to the final drive output component, the central element of the train being the final drive driving gear in this case operating only as an idler gear between the constant mesh output pinion and the corresponding final drive driven gear, such a train providing an output path of potentially favourable efficiency. Furthermore, the total number of gears in such an embodiment can be less than in an equivalent transmission system of a more usual design, and the overall length, weight and cost may thereby all be favourably influenced.

In an arrangement which affords a reverse speed ratio in a particularly advantageous manner, there is provided on the layshaft a further pinion, which may be known as the reverse pinion, and which is engageable directly with a final drive driven gear.

This feature, which again is suited to the power unit arrangement disclosed herein, or to other applications wherein the shafts can be arranged such that the centres of the input shaft, the layshaft and the final drive output component form the vertices of a triangle, can provide a reverse speed ratio wherein the drive path through the transmission system is from the input shaft to the layshaft by way of a pair of gears which may be an indirect gear pair as aforementioned, and thence directly to the final drive output component by way of the reverse pinion and the final drive driven gear. The feature thereby enables a reverse speed ratio to be provided without the need for an additional shaft axis and thus without increasing the envelope of the transmission system, and with only one additional gear being necessary. In embodiments having a number of indirect gear pairs, it is possible, if required, to provide an equal number of reverse speed ratios.

Preferably all the gear pairs in the transmission system should be in continuous meshing engagement, and in order to effect selection of the various speed ratios, there may be provided devices which can connect appropriate gears with their supporting shafts, which devices may be synchronised dog clutches of any known type.

In an embodiment in which the transmission system is of the constant mesh type described above, a number of other preferable features may be combined in a manner which permits further advantage, and thus with the shaft centres being in a triangular arrangement as aforementioned, there are provided the following: an input shaft which extends the full length of the complete transmission system, and which may then be known as the mainshaft; two final drive gear pairs each having a driven member permanently affixed to the final drive output component and a driving gear which is a discrete component supported by the said mainshaft; a number of indirect gear pairs each having one member permanently affixed to either the mainshaft or the layshaft and the mating gear a discrete component supported by the other of the two said shafts; a connecting device as aforesaid adjacent to each of the final drive driving gears and to each indirect gear which is a discrete component; a mechanism to ensure that only one such device can be connected at a given time; a constant mesh output pinion engaging with the larger of the two final drive driving gears; a reverse pinion engaging with the larger of the two final drive driven gears; and a device by means of which the layshaft can be connected either with the constant mesh output pinion or with the reverse pinion, which device may be an unsynchronised dog clutch, and in such an arrangement the shaft centre distances and the relevant gear diameters being chosen such that the constant mesh output pinion cannot contact the final drive driven gear with which it is entrained, and such that similarly the reverse pinion cannot contact the final drive driving gear with which it is entrained.

A transmission system having these features may operate as follows: for all forward speed ratios, the constant mesh output pinion is connected with the layshaft, for each indirect speed ratio, the connecting device adjacent to the appropriate indirect gear pair is engaged, such that drive may pass from the mainshaft to the layshaft and thence to the final drive output component by way of the constant mesh output pinion and the final drive gear pair entrained therewith, with the driving gear operating as an idler; for each direct speed ratio, the connecting device adjacent to the appropriate final drive driving gear is engaged, such that drive may pass directly from the mainshaft to the final drive output component; for a reverse speed ratio an indirect gear pair is engaged as aforementioned, and the layshaft is disconnected from the constant mesh output pinion and instead connected to the reverse pinion, such that drive may pass from the mainshaft to the layshaft and thence directly and in the required sense for a reverse speed ratio, to the final drive output component. The transmission system thus does not require a gearbox output shaft as such nor does it require a spigot arrangement such as is common in layshaft gearboxes, and the design thereby facilitates the provision of a favourable mainshaft bearing arrangement.

Preferably the reverse pinion is provided with a static supportive stub shaft, coaxial with the layshaft, in order to avoid possible large speed differentials while the forward gears are engaged.

In a preferred design for a five speed and reverse constant mesh transmission, the combination of features just described is embodied, and in order to provide fourth and fifth speeds as direct ratios, there are provided two only final drive gear pairs of appropriate diameters, together with three indirect gear pairs for the first, second and third speeds, of which that for first speed is utilised in the reverse gear train.

Whilst providing the two direct upper speed ratios and also the three lower speed ratios having an advantageous drive path, as well as providing a reverse speed ratio, such a transmission system yet contains, other than the parts of the final drive axis, only ten gear wheels in total, and these on only two shaft axes, and may thus be particularly compact and light, as well as of low cost. Furthermore, the arrangement allows the synchronisers for the lower ratios to be provided in positions where the referred inertia of the clutch plate and associated items, as sensed by the synchronisers, is less than in equivalent transmissions of a more usual design, and hence such synchronisers may be comparatively more efficient.

To yet further advantage, the arrangement, particularly when used in conjunction with a primary drive means, lends itself to a feature whereby the said ten gear wheels are not all of different sizes, even in a transmission system which provides a most favourably spaced series of speed ratios, and thus, concerning the indirect gear pairs for second and third speeds, the mainshaft gear of the one pair may have the same diameter as the layshaft gear of the other pair and vice versa, and meanwhile the final drive driving gear for fourth speed may have the larger of these two diameters and also the indirect gear pair for first speed may bear a similar reciprocal relationship to the gear pair which comprises the final drive driving gear for fifth speed and the constant mesh output pinion, and the reverse pinion may also have the smaller of these two diameters the same as the constant mesh output pinion. Thus the set of ten gears may include gears of only four different diameters.

Moreover, in an embodiment in which the further transmission components such as engagement devices are suitably arranged, those gear wheels which are of equal diameter can be made similar in all other respects, and thus the set of ten gears for the five speed and reverse transmission may comprise only four different components, two of which being used twice over and the other two three times over. A further reduction in manufacturing cost may thereby result.

In a particular example wherein the speed ratios are chosen to suit a sports car and advantageously such that the series of vehicle road speeds corresponding to a given engine speed approximately form an arithmetic progression, the set of ten gears is made up only of gearwheels having twenty-seven and thirty-two teeth, mating with pinions having twenty-three and twenty-seven teeth respectively, with, in the final drive positions, the gearwheels mating with driven gears having seventy-seven and seventy-three teeth respectively, and meanwhile a primary dive is incorporated having a ratio appropriate according to the road wheel size to provide the required overall speed ratios.

A gear selector mechanism for operating the dog clutches may be located in the region beneath the crankshaft and adjacent to the mainshaft and, layshaft, such that in vehicle installations where the crankshaft lies between the gearchange lever and the transmission parts, a selector linkage of a favourably direct nature can be arranged to pass beneath the crankshaft.

In an intended application where a transmission system such as that described above is incorporated in parallel with a transverse engine into an integrated power unit, which may be configured in the manner described herein, and where there may then be provided a primary drive from the engine to the transmission which consists of only a single pair of gears, again as described elsewhere herein, the engine and transmission parts may be positioned such that when installed in a vehicle, the main power unit structure, and also the final drive output component, which may be a differential, together with the final drive gear pairs may all be disposed substantially symmetrically about the longitudinal centre line of the vehicle, and such that there may be provided equal length final drive output shafts to an adjacent pair of driven road wheels, and thus the advantages of such symmetry may be obtained in a transmission system in which fourth and fifth speeds, for example, are provided with only two loaded gear meshing points in total between the crankshaft and the driven road wheels.

The indirect gear pairs can then all be located to one side of the final drive parts, and a particularly favourable installation results, for example, when the transmission is of the five speed variety described above and the engine has four cylinders, whereupon the length between the final drive parts, being located adjacent to the central cylinders, and one end of the cylinder block may be just sufficient to conveniently contain the three indirect gear pairs and associated components, and the primary drive parts can be located at this same end of the power unit.

Whilst any power unit of this symmetrical nature is well suited to having directly attached a suspension system, including such a system of the type wherein the final drive output shafts constitute part of the linkage, the power unit configuration according to the present invention may offer an additional advantage in this context in that, with the cylinder block being inclined above the transmission, the upper portions of the end faces of the said block are then more nearly directly above the final drive shafts.

According to a further aspect of the invention, there is provided a suspension system designed to operate on a non-steered driving wheel of a vehicle, and designed to be mounted directly to an adjacent driving unit such as the transverse integrated power unit described herein, in which system a universally jointed driving shaft acts also as a lower transverse member of a linkage, the linkage further comprising an upper transverse arm and a wheel carrying member the driving shaft joints connecting respectively with an axially supported output shaft of the driving unit and a wheel hub spindle which is supported in bearings in the wheel carrying member, while the upper transverse arm is a rigid member and has its ends connected respectively with the top of the wheel carrying member and the supporting structure of the driving unit by means of pivots whose axes both lie approximately parallel to the direction of motion of the vehicle, the linkage thus being constrained to a prescribed articulation only.

Preferably, the upper transverse arm has an effective length less than that of the driving shaft. Whilst providing a more favourable geometry of wheel movement, this feature is particularly suited to a matching of the suspension system with a power unit of the configuration described herein, and where the end faces of the cylinder block lie outboard of the connections to the output driving members, and furthermore the feature is advantageous to the provision of an arm of suitable rigidity.

The axes of the pivots on the upper transverse arm may be slightly angled to provide anti-squat effect, etc., if desired.

Motion of the suspension linkage may be controlled, for example, by a coil spring, concentric with a telescopic damper connected between a lower part of the wheel carrying member and the inner fulcrum of the upper transverse arm.

Such a suspension system, whilst able to locate the wheel in all directions, providing a favourable geometry and being particularly suited to the present application, is also particularly simple of low weight and may be constructed at low cost, these advantages being partly attributable to the utilisation of the driving shaft to perform a second function, and meanwhile the need for devices which allow the driving shaft to change its effective length is eliminated. Also, the adjunction of material required to mount such a suspension to the power unit described herein is minimal.

A further advantage of the suspension system described herein concerns its application to cars of very high performance and to racing cars, wherein it is desirable to provide an undersurface to the bodywork shaped so as to cause a downward force to be applied aerodynamically to the vehicle when it is driven at high speed, thereby improving its cornering ability.

The suspension system described herein, being free of any transverse linkage below the drive shaft, would enable such an undersurface to be formed so as to be more effective, especially in embodiments where the springing medium is also located out of the airstream.

By so mounting the entire suspension system directly to the power unit, favourably accurate control of wheel articulation can be achieved, and meanwhile economies can be made in the structural design of the vehicle. However, it is desirable that the entire assemblage of power unit and suspension should be flexibly mounted to the vehicle structure in order to provide isolation from both power unit and road induced vibrations.

According to a further aspect of the invention, there is provided a power unit mounting system designed particularly to suit a sports car having a transverse power unit such as that described herein installed adjacent to the rear wheels, and applicable also to other vehicles wherein the spatial requirements of the system are acceptable, within which system there is provided attached to the front face of the power unit a substantial beam, which may be of hollow box section and which extends forwards, for example within the space between the seats of the vehicle commonly called the transmission tunnel, and to a point which may be close to a front bulkhead of the passenger compartment, at which point is provided a front flexible mounting connecting the beam with the vehicle structure, while two further such flexible mountings are provided close to each rear wheel, connecting the power unit casings to points on the vehicle structure which may be adjacent to a rear bulkhead.

Thus the longitudinal separation of the front mounting from the two rear mountings may be considerable, and since this distance is effective as a lever arm in reacting to driving torque, mountings may thus be provided which are comparatively more flexible, particularly in a vertical direction, as may be advantageous in providing more effective isolation of vibrations.

In arrangements where the rear suspension is attached directly to the power unit, the mounting flexibilities may advantageously be chosen in accordance with the masses involved such that the power unit mass can act as a dynamic absorber of road induced vibrations.

Meanwhile the beam may itself be utilised for example as a fuel tank, which may thus be located in the centre of the vehicle, in a position of minimum vulnerability in the event of a collision, and also where changes in fuel load have the least effect on vehicle weight distribution.

Furthermore, the beam may also carry the pivot for a gearchange lever, which pivot may thus be rigidly linked to the power unit structure, thereby facilitating the provision of a favourable gearchange linkage. The combination of this feature and a power unit arranged as disclosed herein and having a selector mechanism positioned as aforementioned is particularly advantageous to gearchanging, since a rigid connecting link can be provided passing beneath the crankshaft in a direct line from the gearchange lever to the selector mechanism.

A reversed form of the mounting system may be used in front drive vehicles.

According to yet a further aspect of the invention, there is also provided a power unit, a rotary transmission system, a suspension system and a mounting system or any combination thereof, comprising any novel feature or concept or novel combination of features or concepts disclosed herein.

The invention is further defined by the claims, the contents of which are to be read as included within the disclosure of this specification, and the invention will now be described by way of example with reference to the accompanying diagrammatic drawings, in which:

Figure 14:
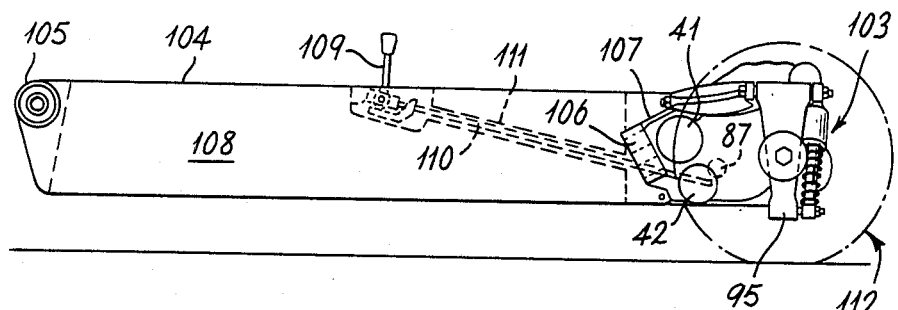
FIG. 14 is a side elevation of a mounting arrangement associated with the power unit and suspension assembly of FIGS. 12 and 13.
Figure 15:
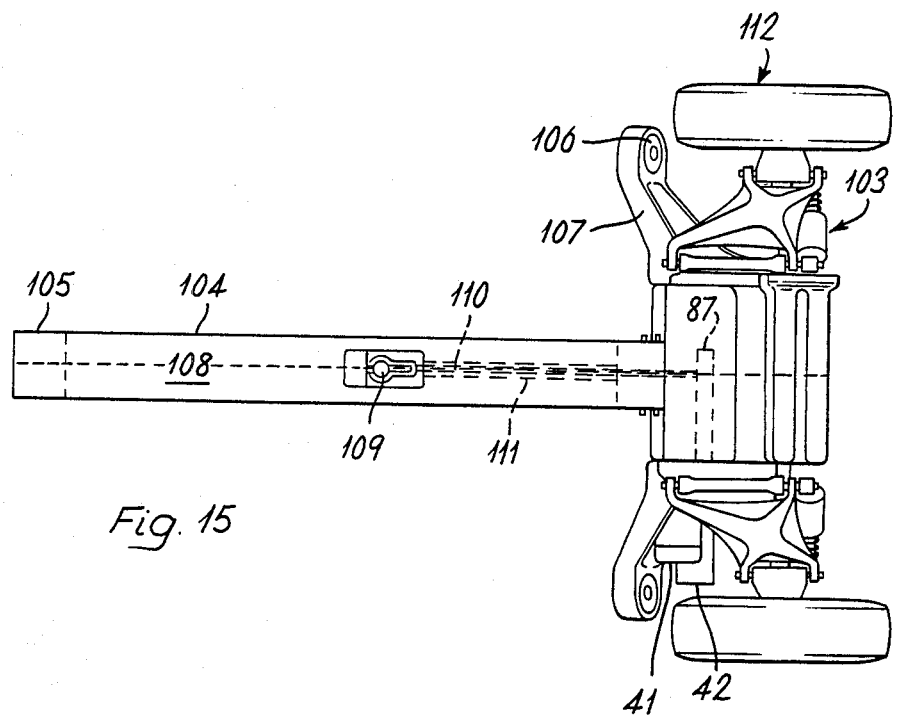

FIG. 15 s a pan view of the mounting arrangement of FIG. 14, and

Figure 1:
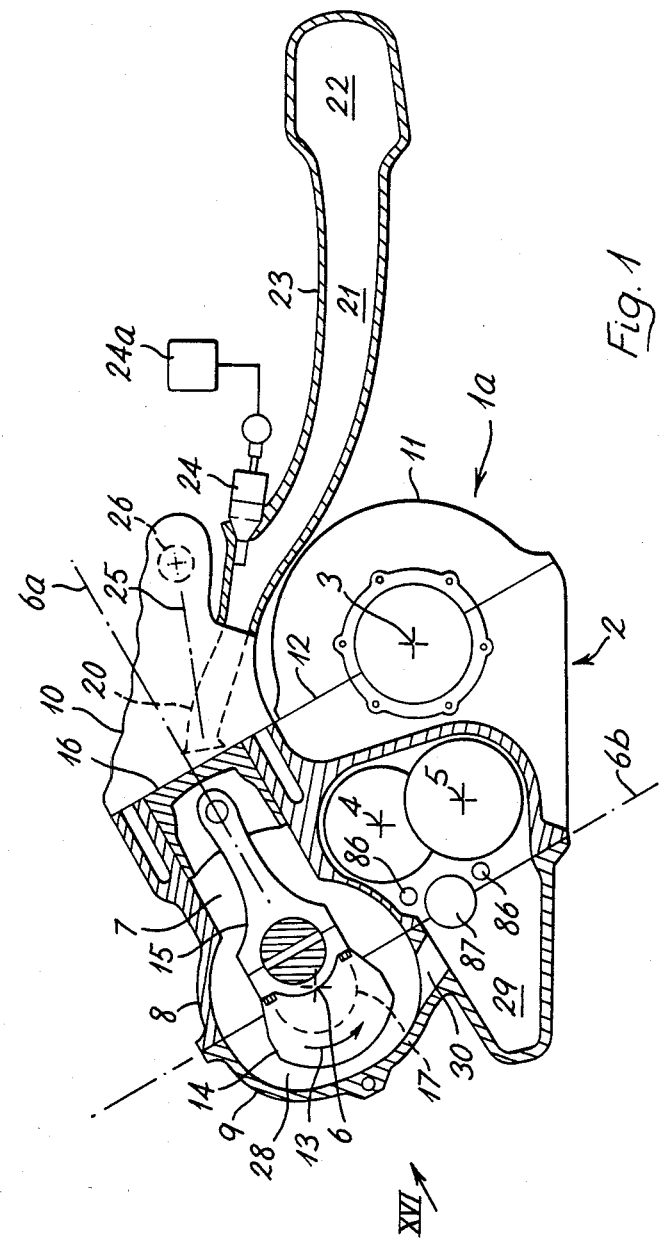
FIG. 1 is a section through an integrated power unit comprising a four-cylinder engine and a transmission system providing five forward speeds and reverse the section being taken in a plane that includes the axis of an outer cylinder and that lies at right angles to the crankshaft axis.
Figure 16:
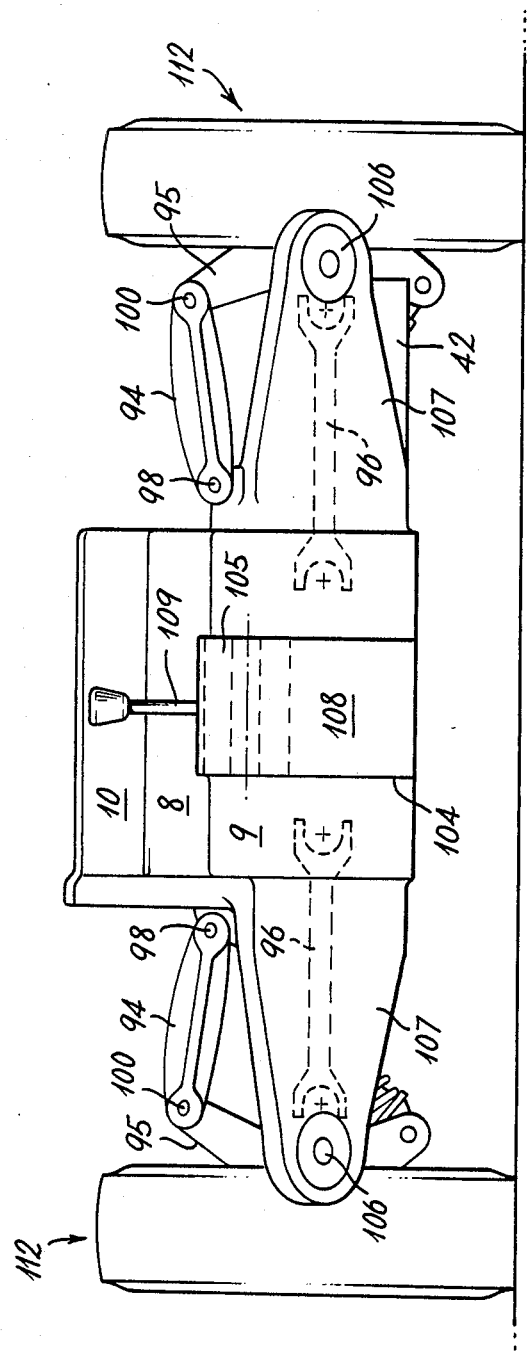

FIG. 16 is an elevation, taken in the direction of the arrow XVI of FIG. 1, showing the connections between the power unit, the vehicle in which it is mounted, and the wheels that it drives and including features also shown in FIGS. 14 and 15.

Figure 2:
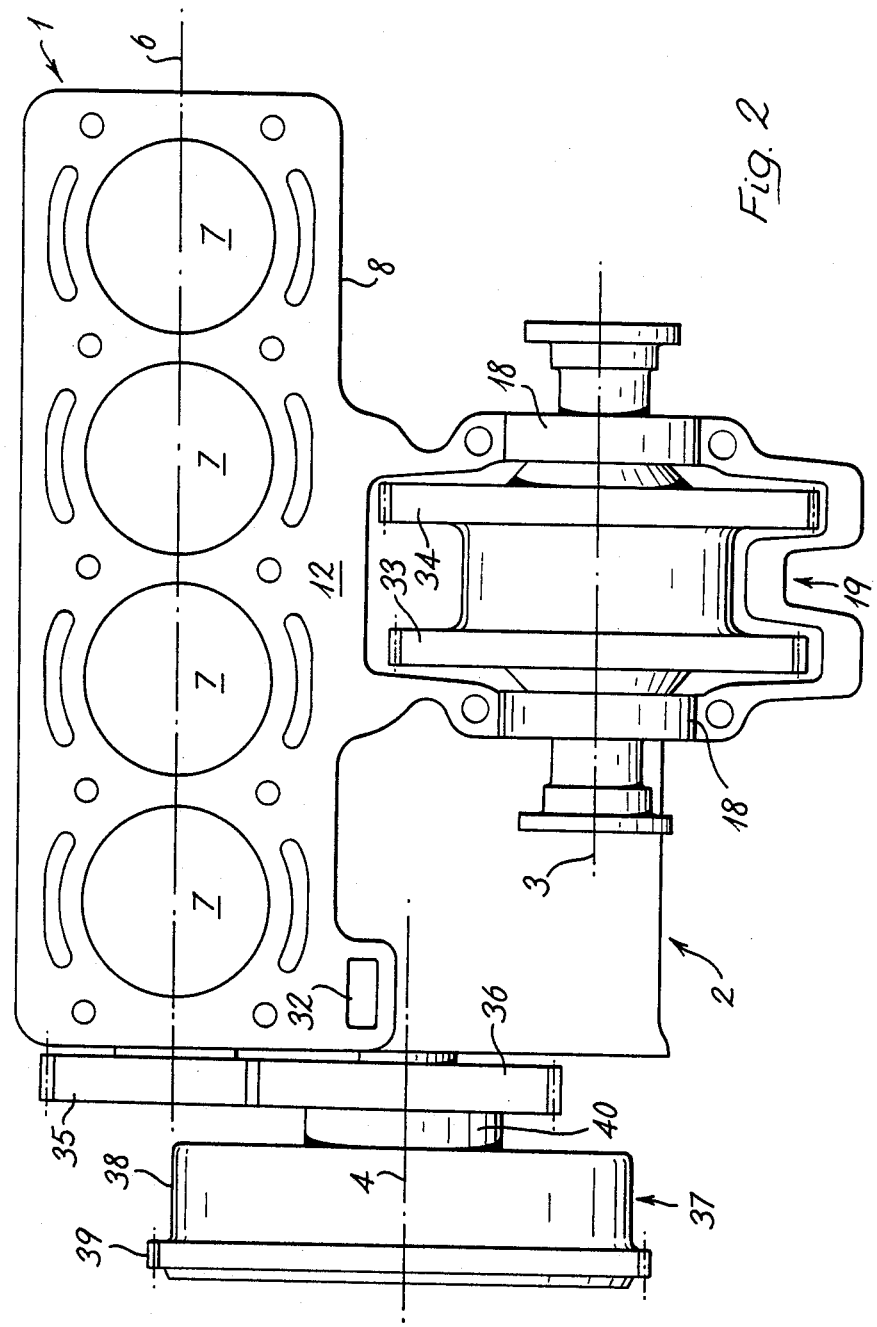
FIG. 2 is an exterior view of tee cylinder head and final drive housing split face of the same power unit with the cylinder head and all the casing parts removed other than the main casing part, the view being in the direction of the cylinder axes.

As best seen from FIG. 1 and from FIG. 2, the power unit 1a comprises an internal combustion engine 1 and a rotary transmission system 2, and provides output drive along a final drive axis 3, the transmission having also an input shaft or mainshaft axis 4 and a layshaft axis 5. The crankshaft axis 6 of the engine lies parallel to all of these transmission axes and forward of them relative to the direction of motion of the vehicle e.g. item 87a, FIGS. 8 and 9) in which the unit 1a is mounted. The cylinders 7 of the engine slope steeply backwards over the transmission system 2, and their axes lie in a common plane 6a. The power unit structure is based upon a main casing part 8, which includes cylinders, crankcase and main transmission housings in an integral unit. A crankcase and transmission closing part 9 adjoins thereto in a plane 6b which includes the crankshaft axis 6 and which is normal to the axes of the cylinders 7, while a cylinder head 10 and a final drive covering part 11 also adjoin the main casing part 8, both abutting the same facing 12, with which also coincides the final drive axis 3, this facing also being normal to the direction cylinder axes. The engine 1 has a crankshaft 14 which rotates about axis 6 in the direction indicated by arrow 13, and is driven by connecting rods 15 from reciprocating pistons 16. It will thus be seen that the final drive axis 3, the input or mainshaft axis 4 and the cylinders 7 all lie to the same side of plane 6b which includes the crankshaft axis 6 and lies at right angles to plane 6a. Indeed in the example illustrated, axes 3, 4 and 6 all lie within or on the boundary of the same quadrant formed by the intersection of planes 6a and 6b. According to the invention, such a relationship between the locations of these three axes promotes compactness and other advantages.

Main bearings 17 are provided half in the main casing part 8 and half in the crankcase and transmission closing part 9. Similarly bearings 18 for a differential unit 19, shown in FIG. 2, are provided half in the main casing part 8 and half in the final drive covering part 11. The cylinder head 10 has inlet ports 20 approaching the cylinders 7 at a steep downdraught angle, and which are fed from long induction tracts 21, which are free of sharp bends, and which are formed, together with a plenum chamber 22, into a manifold 23, which lies at a sufficiently low level to be accommodated beneath the boot floor of a vehicle. Fuel injectors 24, connected to a source of fuel shown schematically at 24a, are provided in an accessible position, and aimed directly at the backs of inlet valves 25, which are operated by camshaft 26. The arrangement of the exhaust valves and ports is not shown, it being intended that alternative versions of the engine should have either, for maximum performance, a cylinder head with twin camshafts and four valves per cylinder, or for minimum height and lower cost, a cylinder head with a single camshaft and two valves per cylinder.

Figure 6:
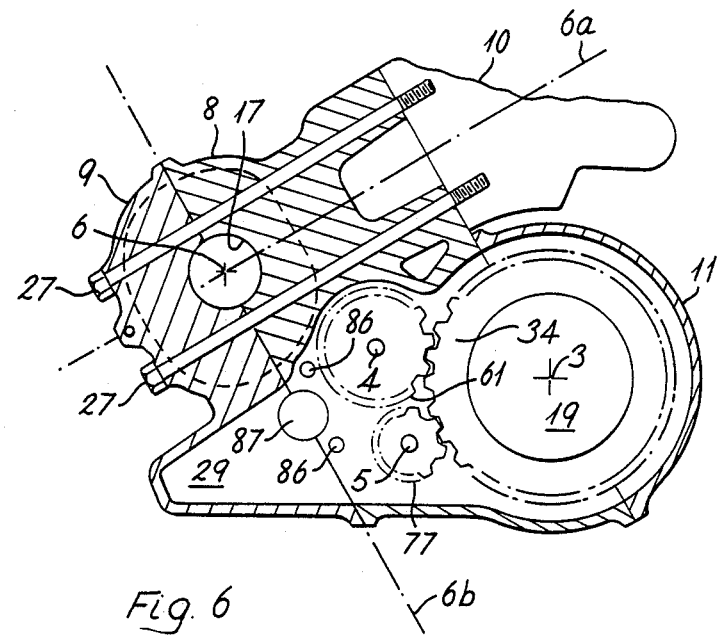
FIG. 6 is a diagrammatic section through the power unit of FIGS. 1 to 3 taken between the central cylinders and particularly shows the cylinder head bolting arrangement and the fourth speed final drive gears.

The arrangement of bolts 27 for the cylinder head 10 and the crankcase and transmission closing part 9 is shown in FIG. 6, from which it can be seen that the camshaft 26 would otherwise mask access to the bolts and prevent removal of the cylinder head 10 and associated parts as a complete assembly. Additional subsidiary attachment bolts (not shown) would be provided for both the crankcase and transmission closing part 9 and the cylinder head 10, to allow either to be removed without the other being disturbed.

Meanwhile the crankcase and transmission closing part 9, as seen in FIGS. 1 or 6, is split into two separate chambers, the upper crankchamber 28 having a smooth internal form to reduce windage, while the lower chamber 29 contains lubricating oil and thus acts as a lubricant sump for the upper crankchamber 28, ports 30 being provided to allow oil to return from the crankchamber 28 to the lower chamber 29 and being arranged tangentially so as to effect a natural continuation of the path of flow within crankchamber 28. The lubricating oil, which is used for both engine and transmission, is also contained in the bottom of the main casing part 8 and the final drive covering part 11. It is circulated by a pump (not shown) concentric with the crankshaft 14, in a circuit which includes a main oil gallery 31. Also concerning lubrication, in FIG. 2 is shown a passage 32 by means of which oil may drain from the cylinder head 10 into the transmission housing part of the main casing part 8.

FIG. 2 shows two final drive driven gears 33 and 34, attached to the differential unit 19 in an arrangement symmetrical with respect to the cylinders 7. At the end of the engine FIG. 2 also shows primary drive gears 35 and 36 by means of which drive is transferred from the crankshaft axis 6 to the mainshaft axis 4 and a clutch unit 37, centred on the mainshaft axis 4, and having starter gear teeth 39 on the periphery of a drum 38. The end covers of the power unit are not shown in this view, but the cover at the primary drive end contains an oil seal acting on the surface 40 between the primary drive driven gear 36 and the clutch unit 37, which is of the dry plate type.

Figure 3:
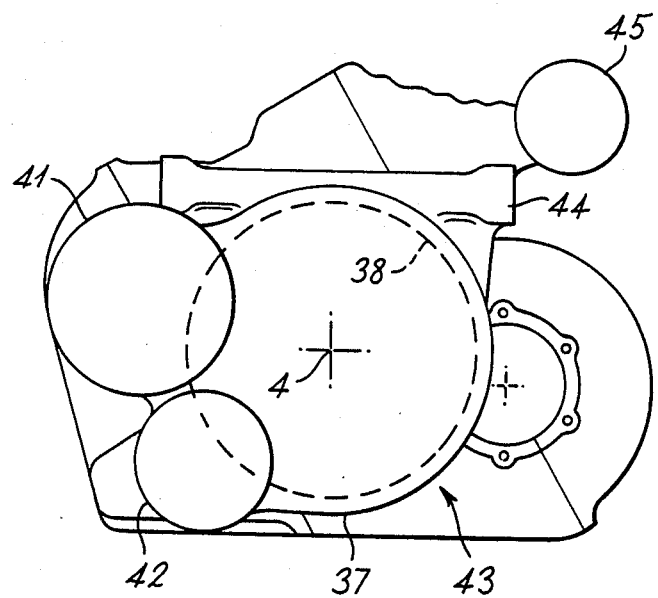
FIG. 3 is an exterior view of the same power unit taken in a direction parallel to the crankshaft axis and showing the arrangement of auxiliary components.

As can be seen from FIG. 3, auxiliary components are arranged at the end of the power unit where the clutch unit 37 is located, there being an alternator 41 driven from the drum 38 of the clutch unit 37 by means of a friction wheel (not shown), and also a starter motor 42 engageable with the teeth 39. Integral with an end cover 43 is a housing 44 containing a pivot pin and bearings for a rear suspension upper link, this pivot lying above the drum 38 of the clutch unit 37. A distributor 45 is driven directly from the end of the camshaft 26.

Figure 4:
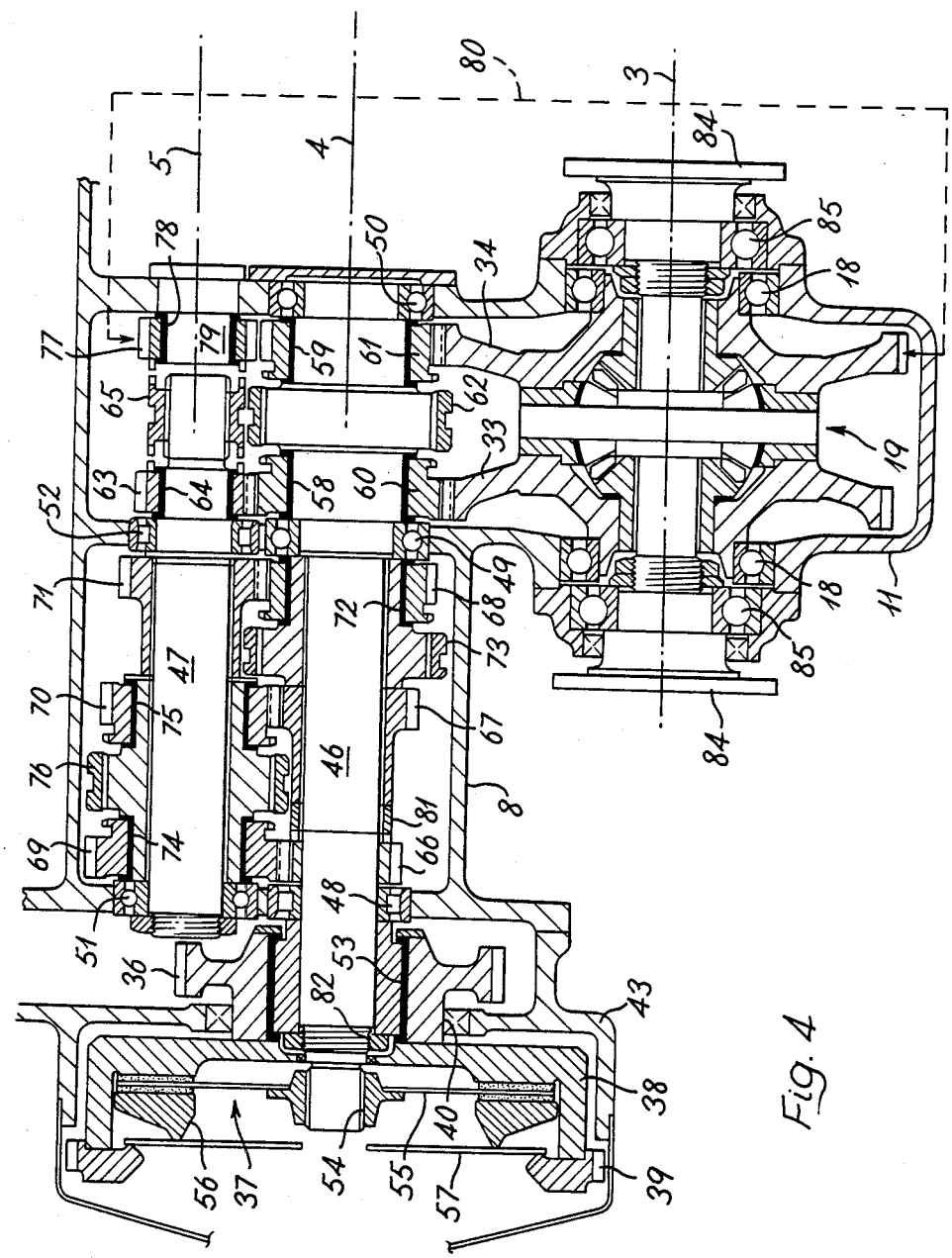
FIG. 4 is a detailed section through the transmission system of the same integrated power unit in which, for ease of understanding, the final drive axis appears as if in the same plane as the mainshaft and layshaft axes.
Figure 5:
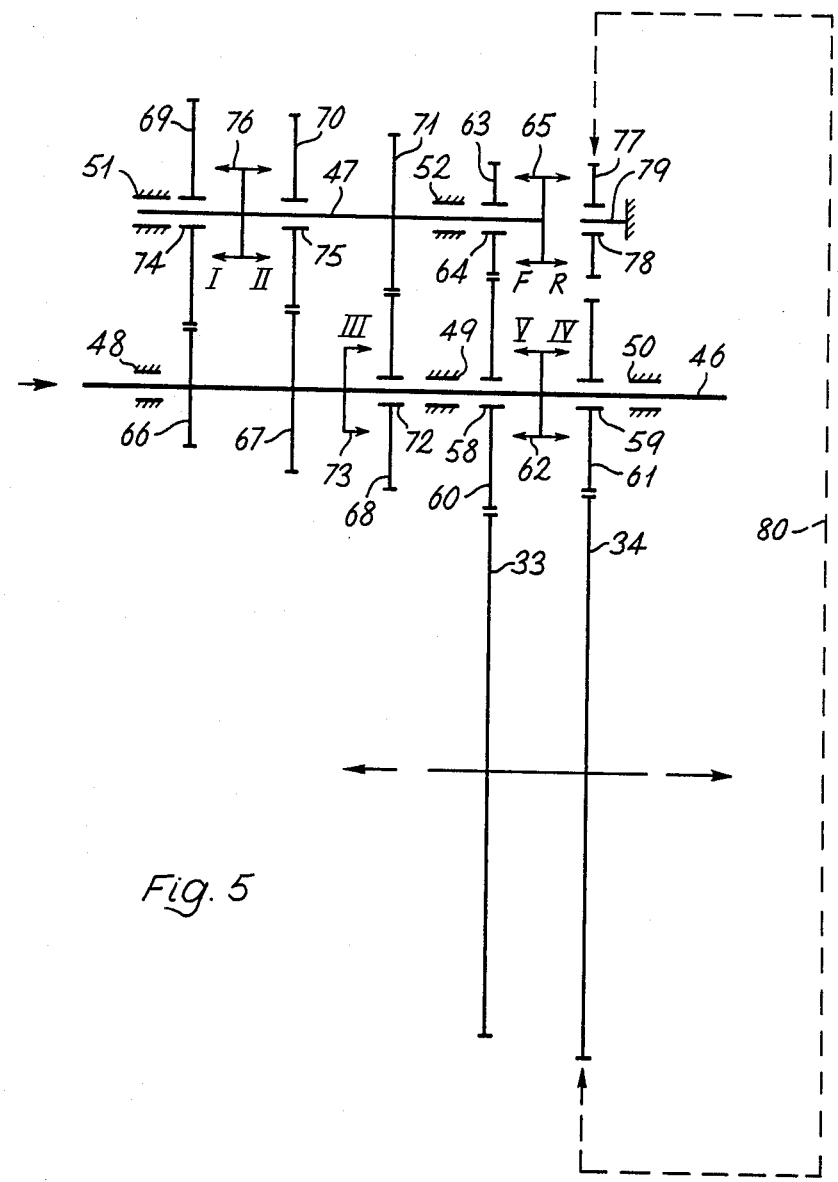
FIG. 5 shows the transmission system of FIG. 4 schematically.
Figure 7:
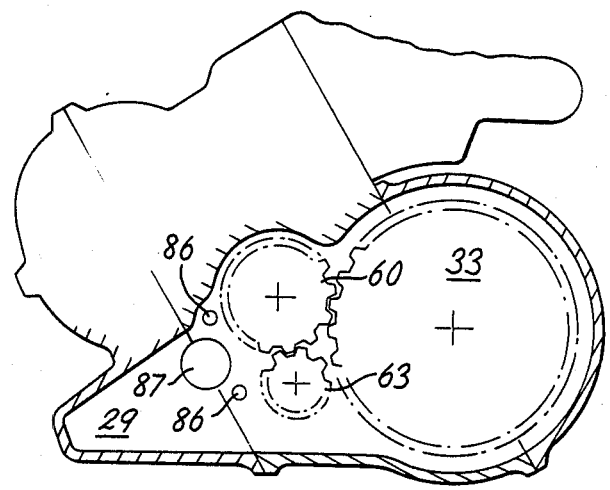
FIG. 7 is another section through the same power unit, showing especially the arrangement of the fifth speed final drive gears.

FIGS. 4 and 5 reveal the arrangement of the components of the transmission system 2 along axes 3, 4 and 5, FIG. 5 being a schematic representation only and FIG. 4 also being a simplified representation: in both figures the axes 3, 4 and 5 appears as if in a single plane, whereas their true relationship is as shown in FIGS. 1, 6 and 7. Besides the differential unit 19 and the gears 33 and 34 attached thereto all centred on the final drive axis 3, the transmission can also be seen to have, on the appropriate axes 4 and 5 respectively, a mainshaft 46 and a layshaft 47. The mainshaft 46 is supported by bearings 48, 49 and 50, while the layshaft 47 is supported by bearings 51 and 52. At its input end, the mainshaft 46 carries on a bearing 53 the assembly of the primary drive driven gear 36 and the clutch unit 37, and is driven therefrom through a spline 54, the clutch unit 37 being constructed according to conventional art and having a driven plate 55 which is clamped between the drum 38 and a pressure plate 56 by means of a diaphragm spring 57. At its other end the mainshaft 46 carries final drive driving gears 60 and 61, on bearings 58 and 59 respectively, and is connectable to either by means of a sliding dog clutch 62. The latter is shown for simplicity without any synchronising devices, though such would normally be provided according to known practice, and it would be controlled from the vehicle gearchange unit (not shown). The driving gears 60 and 61 are in mesh with the driven gears 33 and 34 respectively, these gear pairs when engaged by the dog clutch 62 providing the direct drive for respectively the fifth and fourth of the five forward speeds provided.

The final drive driving gear 60 is also in mesh with a constant mesh output pinion 63, which is carried on a bearing 64 on the layshaft 47, and which is connectable with the layshaft 47 by means of an unsynchronised sliding dog clutch 65. The dogged connection between the layshaft 47 and the pinion 63 is maintained engaged for all forward speeds, the layshaft 47 then being in constant mesh with the output elements of the transmission system. In the indirect first, second and third speeds, the layshaft 47 drives the differential unit 19 through the train of gears 63, 60 and 33, with the dog clutch 62 being in its neutral position so that the gear 60 acts as an idler. To provide input drive from the mainshaft 46 to the layshaft 47 for these indirect speed ratios, the mainshaft 46 carries driving gears 66, 67 and 68, while the layshaft 47 carries, respectively enmeshed therewith, driven gears 69, 70 and 71. The gears 66 and 67 are fast with the mainshaft 46 while the gear 71 is fast with the layshaft 47. The gear 68 is carried on the mainshaft 46 by a bearing 72, and is connectable to the mainshaft 46 by means of a sliding dog clutch 73, in order to provide the third speed. Similarly the driven gears 69 and 70 are carried on the layshaft 47 by bearings 74 and 75 respectively, and either is connectable with the layshaft 47 by means of a sliding dog clutch 76, in order to provide first or second speeds respectively. The dog clutches 73 and 76 are shown for simplicity, like the dog clutch 62, without their synchronising devices, and similarly likewise are controlled from the vehicle gearchange unit.

The unsynchronised sliding dog clutch 65, is also used for connecting the layshaft 47 with a reverse pinion 77, which is carried on a bearing 78 on a stub shaft 79, co-axial with the layshaft 47 Although not apparent from FIGS. 4 or 5 due to the simplified representation used therein, the reverse pinion 77 is actually in mesh with the final drive driven gear 34, as indicated by the dotted line 80.

FIGS. 6 and 7 show the true relationships of the gears 34, 61 and 77, and 33, 60 and 63 respectively, and thus it is apparent from FIG. 7 how the constant mesh output pinion 63 is in mesh with the final drive driving gear 60, but clear of the corresponding driven gear 33, while FIG. 6 shows how the reverse pinion 77, while being in mesh with the final drive driven gear 34, is clear of the corresponding driving gear 61.

The pinions 63 and 77 are of equal size, a common component with seventeen teeth being used for both of these items, and the same component is also used as the first speed driving gear 66, In a similar manner, a common component with thirty-two teeth is used for both of gears 60 and 69, a common component with twenty-seven teeth is used for gears 61, 68 and 70, and a common component with twenty-three teeth is used for gears 67 and 71. The set of ten gears on the axes 4 and 5 is thus made up from only four different components. The final drive driven gears 33 and 34 have seventy-three and seventy-seven teeth respectively, and in the illustrated embodiment the primary drive gears 35 and 36 have forty-eight and fifty-three teeth respectively.

In order that the first speed gear 66 can be commonised with pinions 63 and 77, and also because of considerations of desirable diameters. The gear 66, as shown in FIG. 4, has a plain bore where it locates on the mainshaft 46, and is driven therefrom by means of a splined dog coupling ring 81, the whole mainshaft assembly being clamped together by a nut 82. FIG. 4 also shows how the differential unit 19 has side bevels by which it is splined to output shafts 84 which are supported by bearings 85. Meanwhile, FIGS. 1, 6 and 7 also indicate elements of a gear selection mechanism of known type which includes selector rods 86 and an assembly of concentric cam drums 87.

FIG. 8 to 11 exemplify installations of the power unit in vehicles each indicated generally by reference 87a.

Figure 8:
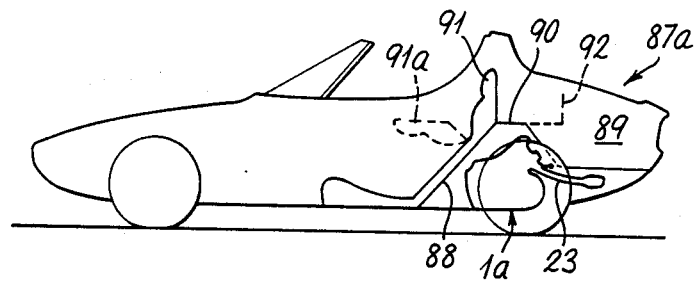
FIG. 8 is an outline elevation of the power unit of FIGS. 1 to 7 installed adjacent to the rear wheels of a sports car, and equipped with a cylinder head with twin overhead camshafts.

In FIG. 8 is shown a two seater sports car 87a in which the power unit 1a is fitted immediately behind the seats and drives the rear wheels. The profile of the power unit is seen to be especially suited to this particular application, being of a wedge like form which corresponds with the shape of the recess which exists beneath and behind a sloping bulkhead 88, such that spatially efficient packaging of the vehicle elements is facilitated. As a result, the rear luggage space 89 is seen to be comparatively large for a car of this type, and also, due to the lowness of the power unit, a shelf 90 can additionally be provided for the stowage of small items and is accessible from within the passenger compartment. Seat headrests 91 are hinged to pivot to positions 91a to facilitate such access, while a division 92 between the shelf 90 and the luggage space 89 is adjustable in position to allow the relative sizes of the two areas to be varied as required. Meanwhile it can be seen that the power unit arrangement allows the induction system to be accommodated with the manifold 23 beneath the boot floor and thus not encroaching into useable luggage space. Also, the power unit, which has a twin camshaft cylinder head, is seen to be located such that its centre of gravity would lie favourably within the vehicle wheelbase.

Figure 9:
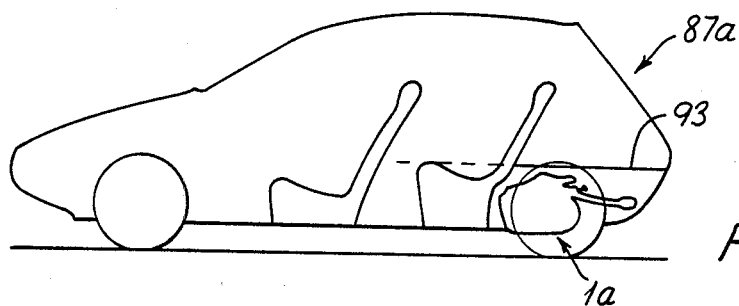
FIG. 9 is an outline elevation of the power unit of FIGS. 1 to 7 installed adjacent to the rear wheels of a saloon car, and equipped with an alternative cylinder head with a single overhead camshaft.

In FIG. 9 is shown a four seater saloon car 87a which is of the 'hatchback' type, in which the power unit 1a, equipped with a single camshaft cylinder head for minimum height, is again fitted to drive the rear wheels, and yet due to its lowness is accommodated beneath a rear luggage platform 93 which is little higher than that in corresponding front drive cars. The luggage platform would be extendable by folding the rear seats, as is conventional in such vehicles, while a further and preferably invisible luggage space could be provided at the front of the vehicle.

Figure 10:
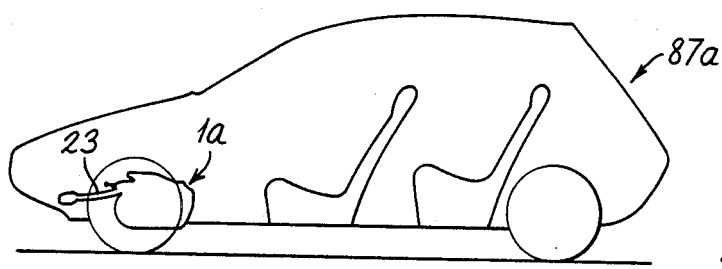
FIG. 10 is an outline elevation of a variation of the power unit of FIGS. 1 to 7, installed adjacent to the front wheels of a saloon car.
Figure 11:
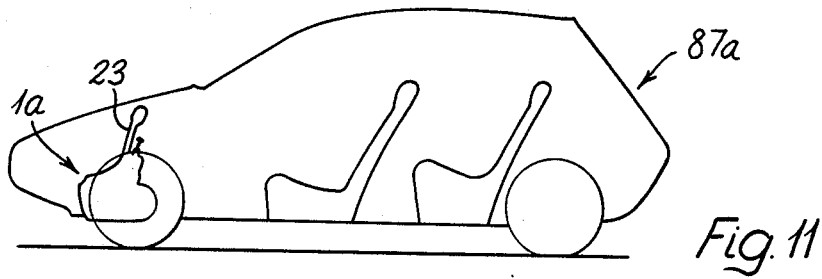
FIG. 11 is an outline elevation of another variation of the same power unit, installed adjacent to the front wheels of a saloon car.

In FIGS. 10 and 11 are shown two examples where the power unit 1a in slightly modified form is installed to drive the front wheels of a saloon car 87a. As shown in FIG. 10, the power unit is fitted in a reversed configuration with its crankshaft behind the final drive axis. In order to have the correct direction of rotation of the output drive shafts, either the direction of rotation of the crankshaft would have to be the reverse, relative to the rest of the power unit, of that indicated by arrow 13 in FIG. 1, or the primary drive gears 35 and 36 would have to be replaced by a chain drive or have an idler gear interposed. As shown in FIG. 11, the engine has its crankshaft ahead of the final drive axis, but, for greater convenience of installation, has a different type of cylinder head such that the induction manifold 23 can be of a downdraught nature. In both of the examples shown in FIGS. 10 and 11, the configuration of the power unit can permit either an exceptionally low and aerodynamic bonnet line, or the provision of a front luggage space as aforementioned above the power unit.

In all of the examples shown in FIGS. 8 to 11, the power unit would be installed centrally within the width of the vehicle, so that variants of the illustrated designs with a greater number of cylinders in line could be similarly accommodated.

Figure 12:
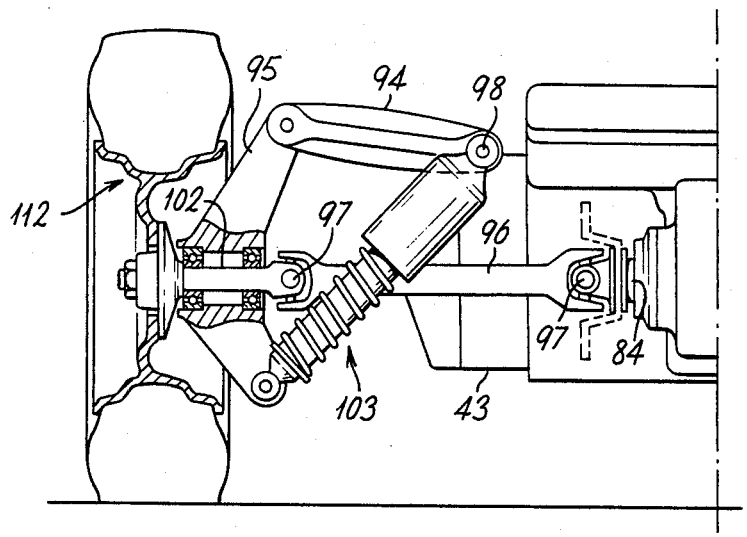
FIG. 12 is an elevation of a rear suspension attached to the power unit of FIGS. 1 to 7 when mounted in a vehicle as in FIGS. 8 or 9, as viewed from the rear of the vehicle.
Figure 13:
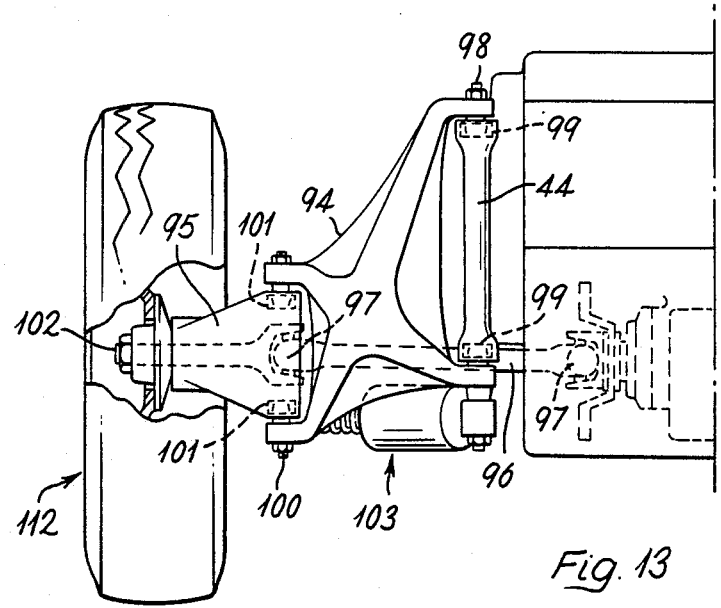
FIG. 13 is a plan view of the rear suspension arrangement of FIG. 12.

As depicted in FIGS. 12 and 13, the rear suspension of a wheel 112 of the vehicle comprises an upper transverse arm 94, a wheel carrier 95 and a final drive shaft 96 which acts as a lower transverse arm and has universal joints 97 at either end. The arm 94 has at its inner end a pivot pin 98 supported by bearings 99 in the housing 44 of the power unit end cover 43, while at its outer end another pivot pin 100 carries bearings 101 held in the wheel carrier 95. The arm 94 and the wheel carrier 95 are both substantially proportioned members, whilst the bearings 99 and 101 are of the taper roller type, such that the assemblage of the arm 94 and the carrier 95 is able to sustain vehicle tractive forces.

The universal joint 97 of a drive shaft 96 is connected, at its inner end to the differential output shaft 84 (seen also in FIG. 4, supported by bearing 85) and at its outer end to a wheel hub spindle 102. Articulation of the linkage is controlled by a spring-damper unit 103 connecting the wheel carrier 95 to an extension of the inner pivot pin 98. The suspension unit shown in FIGS. 12 and 13 is designed for that side of the power unit on which the primary drive is located. On the opposite side, the suspension is similar, except that a housing equivalent to 44 is formed on the opposite end cover (not shown) of the power unit.

The arrangement for mounting the power unit and rear suspension assembly into a vehicle is shown in FIGS. 14 and 15. A beam 104 is attached to the front of the power unit and has at its forward end a flexible front mounting bush 105 by which it is connected to the vehicle structure. Two further rear mounting bushes 106 are fitted into arms 107 which are formed as extensions of the end casings of the power unit. The beam 104 is of hollow box section such that a space 108 can be used as a fuel tank. The beam 104 also carries a gearchange lever 109 which connects with the selector cam drum assembly 87 of the transmission system by means of a rod 110, which runs in a tube 111 through the fuel tank section 108 of the beam 104.

A power unit assembly as described above with reference to the drawings would offer numerous advantages. Whilst many of the features are individually advantageous, they are especially intended to be mutually complementary and contributory to a design in which engine, auxiliary, transmission, suspension and mounting components are all fully integrated into a particularly compact, lightweight assembly, with no sacrifice of optimum transmission or induction system efficiency, having a low centre of gravity, advantageous mounting characteristics and a favourable gearchange arrangement, and which yet offers benefits in terms of manufacturing cost. Such an assembly would facilitate the design of cars which are more compact, light and fuel efficient, particularly high performance cars and especially sports cars.

I claim:

1. A power unit for a self-powered vehicle, comprising:
    a casing structure for said power unit;
    a reciprocating piston internal combustion engine comprising a plurality of pistons working in a plurality of cylinders disposed in line, whereby the axes of said cylinders are parallel and lie in a common first plane, cylinder head structures for and adjacent to said cylinders, a crankcase, and a crankshaft rotatable within said crankcase about an axis and driven by said pistons;
    a multi-ratio transmission system comprising a plurality of gear-carrying shafts including an input shaft, and two coaxial output shafts adapted respectively to drive two wheels located on opposite sides of said power unit, said axes of said output shafts being substantially parallel to said crankshaft axis, and said input shaft being in driving communication with said crankshaft;
    a second plane lying at right angles to said common first plane and including said crankshaft axis and a third plane parallel to said second plane and passing through a boundary between said cylinders and their said adjacent cylinder head structures;
    said transmission system being arranged alongside side cylinders and so that said axes of said output shafts substantially coincide with said third plane and the remainder of said plurality of the said gear-carrying shafts of said multi-ratio ratio transmission system all lie between said parallel second and third planes.

2. In or for a self-powered vehicle, a power unit according to claim 1 in which said casing structure includes a main casing component, said component including first and second regions, in which said cylinders lie within said first region and parts of said transmission system lie within said second region.

3. A power unit for a self-powered vehicle according to claim 1 in which said casing structure includes a casing part within which said multi-ratio transmission system is located, in which a first plane joint face is presented by said casing part and is substantially coplanar with said axes of said output shafts, in which there are cylinder head structures for and adjacent to said cylinders, and in which said joint face is also substantially coplanar with said boundary between said cylinders and their respective said cylinder head structures.

4. In or for a self-powered vehicle, a power unit according to claim 1 which said casing structure also includes cover means for said crankcase and for an adjacent part of said transmission system, and in which said casing structure presents a plane joint face against which said cover means engage.

5. In or for a self-powered vehicle, a power unit according to claim 4 in which said crankshaft axis is substantially co-planar with said second plane joint face.

6. In or for a self-powered vehicle, a power unit according to claim 4 in which said boundary and plane joint faces are parallel.

7. In or for a self-powered vehicle, a power unit according to claim 1 including cover means for the part of said transmission system in which said output shafts are located, and in which said cover means engage with said casing structure in the plane of said first plane joint face.

8. In or for a self-powered vehicle, a power unit according to claim 1 including a connection between the parts of said casing structure encasing said engine and said transmission system, whereby in use the said part encasing said transmission system can serve also as a lubricant sump for said engine.

9. In or for a self-powered vehicle, a power unit according to claim 8 in which said connection is in the form of a passage formed within said casing structure itself.

10. In or for a self-powered vehicle, a power unit according to claim 9 in which said passage enters said part of said casing unit which encases said engine adjacent said crankshaft, in a direction substantially tangential to the rotary motion of said crankshaft.

11. In a self-powered vehicle, a power unit according to claim 1 which said vehicle presents a longitudinal centre line and a pair of driven wheels located symmetrically one to each side of said centre line so as to be located on a common virtual axle, in which said engine is located so that said plurality of cylinders are disposed to either side of said centre line in a substantially symmetrical manner, in which said transmission output shaft is substantially coincident with said virtual axle at the normal ride height of said vehicle, in which means of connection of each of said pair of wheels to each of said output shafts respectively include universally-jointed drive shafts and in which said transmission is located substantially vertically beneath said engine within said casing.

12. In a self-powered vehicle, an integrated power unit according to claim 11 in which fuel inlet ports to said engine are located on the lower side of said engine adjacent to said transmission system, and an induction tract for said engine also enters said engine at a location on the lower side thereof which is adjacent to said transmission system, and in which said induction tract as it extends away from said engine passes over the part of said casing structure containing said transmission system and then descends, so that the free end of said induction tract is vertically lower than said location at which said tract enters said engine.

13. In a self-powered vehicle, an integrated power unit according to claim 11 in which each said wheel of said pair presents a wheel hub spindle, including a suspension system of said pair of driven wheels, said suspension system comprising for each wheel a supporting linkage including lower and upper transverse members and a wheel-carrying member, in which for each wheel said universally-jointed drive shaft acts as said lower transverse member, bearings in said wheel-carrying member support said hub spindle, and said upper transverse member is rigid and there are connections between one end of said transverse member and said wheel-carrying member and between the other end of said rigid member and said casing structure, said connections being in the form of pivots the axes of which lie substantially parallel to the direction of rolling of said wheel.

14. In a self-powered vehicle having front and two rear road wheels and a compartment containing seats a power unit according to claim 1 in which said engine is installed adjacent to said rear wheels and with said crankshaft lying transversely relative to said vehicle, in which one end of a substantial beam is fixed to said casing and extends forwards, in which a flexible mounting connects the other end of said beam at a location transversely central relative to said vehicle and longitudinally close to said front bulkhead of said payload compartment, and in forward of said seats and in which two further flexible mountings, transversely close to each of said two rear wheels of said vehicle respectively connect said engine to said vehicle structure at locations which are longitudinally rearward of said seats.

15. In or for a self-powered vehicle having rear and two front road wheels and a compartment containing seats, a power unit according to claim 1 in which said engine is installed adjacent to said front wheels and with said crankshaft lying transversely relative to said vehicle, in which one end of a substantial beam is fixed to said casing and extends rearward, in which a flexible mounting connects the other end of said beam at a location transversely central relative to said vehicle and longitudinally rearward of said seats and in which two further flexible mountings, transversely close to each of said two front wheels of said vehicle respectively, connect said engine to said vehicle structure at locations which are longitudinally forward of said seats.

* * * * *

UNITED STATES PATENT AND TRADEMARK OFFICE
CERTIFICATE OF CORRECTION

PATENT NO. : 4,821,826

DATED : April 18, 1989

INVENTOR(S) : Geoffrey P. Lings

It is certified that error appears in the above-identified patent and that said Letters Patent is hereby corrected as shown below:

Col. 9, lines 1 through 6, left-hand corner of each, insert the following:

-- path thus ...
between the ...
ponent, these ...
and each ...
a conventional ...
junction with ... --

Col. 15, line 18, change "FIG. 15 s a pan" to -- FIG. 15 is a plan --.

Signed and Sealed this

Tenth Day of September, 1991

Attest:

HARRY F. MANBECK, JR.

*Attesting Officer*     *Commissioner of Patents and Trademarks*